US012451067B2

(12) United States Patent
Lee et al.

(10) Patent No.: US 12,451,067 B2
(45) Date of Patent: Oct. 21, 2025

(54) PIXEL CIRCUIT HAVING TRANSISTORS WITH BACK GATE ELECTRODES RECEIVING POWER SUPPLY VOLTAGE AND DISPLAY DEVICE INCLUDING THE SAME

(71) Applicant: Samsung Display Co., Ltd., Yongin-Si (KR)

(72) Inventors: Sehyun Lee, Yongin-si (KR); Wonjun Lee, Yongin-si (KR); Jinjoo Ha, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/443,064

(22) Filed: Feb. 15, 2024

(65) Prior Publication Data

US 2024/0355279 A1 Oct. 24, 2024

(30) Foreign Application Priority Data

Apr. 20, 2023 (KR) ........................ 10-2023-0052071

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2310/08* (2013.01); *G09G 2320/02* (2013.01)

(58) Field of Classification Search
CPC .................................................... G09G 3/3233
USPC .......................................................... 345/212
See application file for complete search history.

(56) References Cited

U.S. PATENT DOCUMENTS

| | | | | |
|---|---|---|---|---|
| 11,211,000 | B2 | 12/2021 | Miura et al. | |
| 11,527,595 | B2 | 12/2022 | Tsuboi | |
| 2015/0138253 | A1* | 5/2015 | Kimura | G09G 3/3283 345/77 |
| 2018/0005576 | A1* | 1/2018 | Yoon | G09G 3/3233 |
| 2020/0258921 | A1* | 8/2020 | Takahashi | H05B 33/14 |
| 2021/0248961 | A1* | 8/2021 | Yang | G09G 3/3266 |

FOREIGN PATENT DOCUMENTS

| | | | |
|---|---|---|---|
| JP | 6867737 | B2 | 5/2021 |
| JP | 2021-120700 | A | 8/2021 |
| KR | 10-2022-0107797 | A | 8/2022 |

* cited by examiner

*Primary Examiner* — Long D Pham
(74) *Attorney, Agent, or Firm* — Innovation Counsel LLP

(57) ABSTRACT

A pixel circuit comprises a light emitting element, a first transistor providing a driving current to the light emitting element, a first capacitor including a first electrode connected to a first electrode of the first transistor and a second electrode connected to a gate electrode of the first transistor, a second capacitor including a first electrode connected to the gate electrode of the first transistor and a second electrode connected to a second electrode of the first transistor, a second transistor providing a data voltage to a first electrode of a third capacitor in response to a first write gate signal, a third capacitor including a second electrode connected to the gate electrode of the first transistor, and a third transistor providing the data voltage to the gate electrode of the first transistor in response to a second write gate signal.

16 Claims, 14 Drawing Sheets

PIXEL CIRCUIT HAVING TRANSISTORS WITH BACK GATE ELECTRODES RECEIVING POWER SUPPLY VOLTAGE AND DISPLAY DEVICE INCLUDING THE SAME

This application claims priority, under 35 USC § 119, to Korean Patent Application No. 10-2023-0052071 filed on Apr. 20, 2023 in the Korean Intellectual Property Office (KIPO), the entire disclosure of which is incorporated by reference herein.

BACKGROUND

1. Field

Embodiments of the present inventive concept relate to a pixel circuit. More particularly, embodiments of the present inventive concept relate to a pixel circuit and a display device including the same for compensating for a change in threshold voltage.

2. Description of the Related Art

Generally, a display device may include a display panel and a display panel driver. The display panel may include gate lines, data lines, and pixel circuits. The display panel driver includes a gate driver for providing gate signals to the gate lines, a data driver for providing data voltages to the data lines, and a driving controller for controlling the gate driver and the data driver.

Recently, a display device for providing virtual reality (VR) or augmented reality (AR) is emerging, and the display device may require a low area and high pixels per inch (PPI). In this case, since a pitch occupied by the pixel circuit is narrowed, the number of transistors constituting the pixel circuit and signals applied to the pixel circuit may be restricted.

Also, as the PPI increases, a data range of the data voltage may decrease. That is, as the PPI increases, luminance accuracy according to a change in the data voltage may decrease relatively.

SUMMARY

Embodiments of the present inventive concept provide a pixel circuit for a low area and a high PPI Embodiments of the present inventive concept provide a display device including the pixel circuit.

In an embodiment of a pixel circuit according to the present inventive concept, the pixel circuit comprises a light emitting element, a first transistor configured to provide a driving current to the light emitting element, a first capacitor including a first electrode connected to a first electrode of the first transistor and a second electrode connected to a gate electrode of the first transistor, a second capacitor including a first electrode connected to the gate electrode of the first transistor and a second electrode connected to a second electrode of the first transistor, a second transistor configured to provide a data voltage to a first electrode of a third capacitor in response to a first write gate signal, the third capacitor including a second electrode connected to the gate electrode of the first transistor, and a third transistor configured to provide the data voltage to the gate electrode of the first transistor in response to a second write gate signal.

The pixel circuit may further include a fourth transistor configured to provide a first power supply voltage to the first transistor in response to an emission signal.

The pixel circuit may further include a fifth transistor configured to provide a bias voltage to an anode electrode of the light emitting element in response to an initialization gate signal.

In a first period, the emission signal, the first write gate signal, the second write gate signal, and the initialization gate signal may have an active level.

In the first period, the second transistor may be configured to provide a reference voltage to the first electrode of the third capacitor and the third transistor may be configured to provide the reference voltage to the gate electrode of the first transistor.

In a second period after the first period, the first write gate signal, the second write gate signal, and the initialization gate signal may have the active level, and the emission signal has an inactive level.

The first capacitor may be configured to store a threshold voltage of the first transistor when the third transistor is turned off in the second period.

In a third period after the second period, the emission signal, the first write gate signal, and the initialization gate signal may have the active level, and the second write gate signal may have the inactive level.

In the third period, the second transistor may be configured to provide the data voltage to the first electrode of the third capacitor.

In the third period, the first capacitor connected between the gate electrode and the first electrode of the first transistor may compensate for the amount of change in the threshold voltage of the first transistor.

In a fourth period after the third period, the emission signal and the initialization gate signal may have the active level, and the first write gate signal and the second write gate signal may have the inactive level.

In the fourth period, the anode electrode of the light emitting element may be initialized with the bias voltage.

In a fifth period after the fourth period, the emission signal may have the active level and the first write gate signal, the second write gate signal, and the emission signal may have the inactive level.

In the fifth period, the second capacitor compensates for an amount of change in voltage at the gate electrode of the first transistor that happens in response to change in voltage at the anode electrode of the light emitting element.

Back gate electrodes of the first to fifth transistors may receive the first power supply voltage.

The first to fifth transistors may be P-type transistors.

In an embodiment of a display device according to the present inventive concept, the display device a display panel including a pixel circuit, a data driver configured to apply a data voltage to the pixel circuit, a gate driver configured to a first write gate signal and a second write gate signal to the pixel circuit, and a driving controller configured to control the data driver and the gate driver. The pixel circuit includes a light emitting element, a first transistor configured to provide a driving current to the light emitting element, a first capacitor including a first electrode connected to a first electrode of the first transistor and a second electrode connected to a gate electrode of the first transistor, a second capacitor including a first electrode connected to the gate electrode of the first transistor and a second electrode connected to a second electrode of the first transistor, a second transistor configured to provide a data voltage to a first electrode of a third capacitor in response to the first write gate signal, the third capacitor including a second electrode connected to the gate electrode of the first transistor, and a third transistor configured to provide the data voltage to the gate electrode of the first transistor in response to the second write gate signal.

The pixel circuit may further include a fourth transistor configured to provide a first power supply voltage to the first transistor in response to an emission signal.

The pixel circuit may further include a fifth transistor configured to provide a bias voltage to an anode electrode of the light emitting element in response to an initialization gate signal.

Back gate electrodes of the first to fifth transistors may receive a first power supply voltage.

According to the pixel circuit and the display device according to the embodiments, the pixel circuit may extend the data range through voltage distribution of the first to third capacitors connected to the gate electrode of the first transistor. The pixel circuit may further expand the data range by allowing the first electrode of the second capacitor to be in a floating state while emitting light. The pixel circuit may include the first capacitor connected between the gate electrode of the first transistor and the first electrode of the first transistor, so that the change in the threshold voltage of the first transistor may be compensated for. The pixel circuit may include the second capacitor connected between the gate electrode of the first transistor and the second electrode of the first transistor, so that during the light emission, the change in threshold voltage of the first transistor may be additionally compensated for. The pixel circuit may apply the first power supply voltage to the back gate electrode of the first transistor so that the body effect on the first transistor may be minimized.

BRIEF DESCRIPTION OF THE DRAWINGS

The above and other features of embodiments of the present inventive concept will become more apparent by describing in detailed embodiments thereof with reference to the accompanying drawings, in which.

DETAILED DESCRIPTION OF THE EMBODIMENTS

Hereinafter, embodiments of the present inventive concept will be described in detail with reference to the accompanying drawings.

Figure 1:
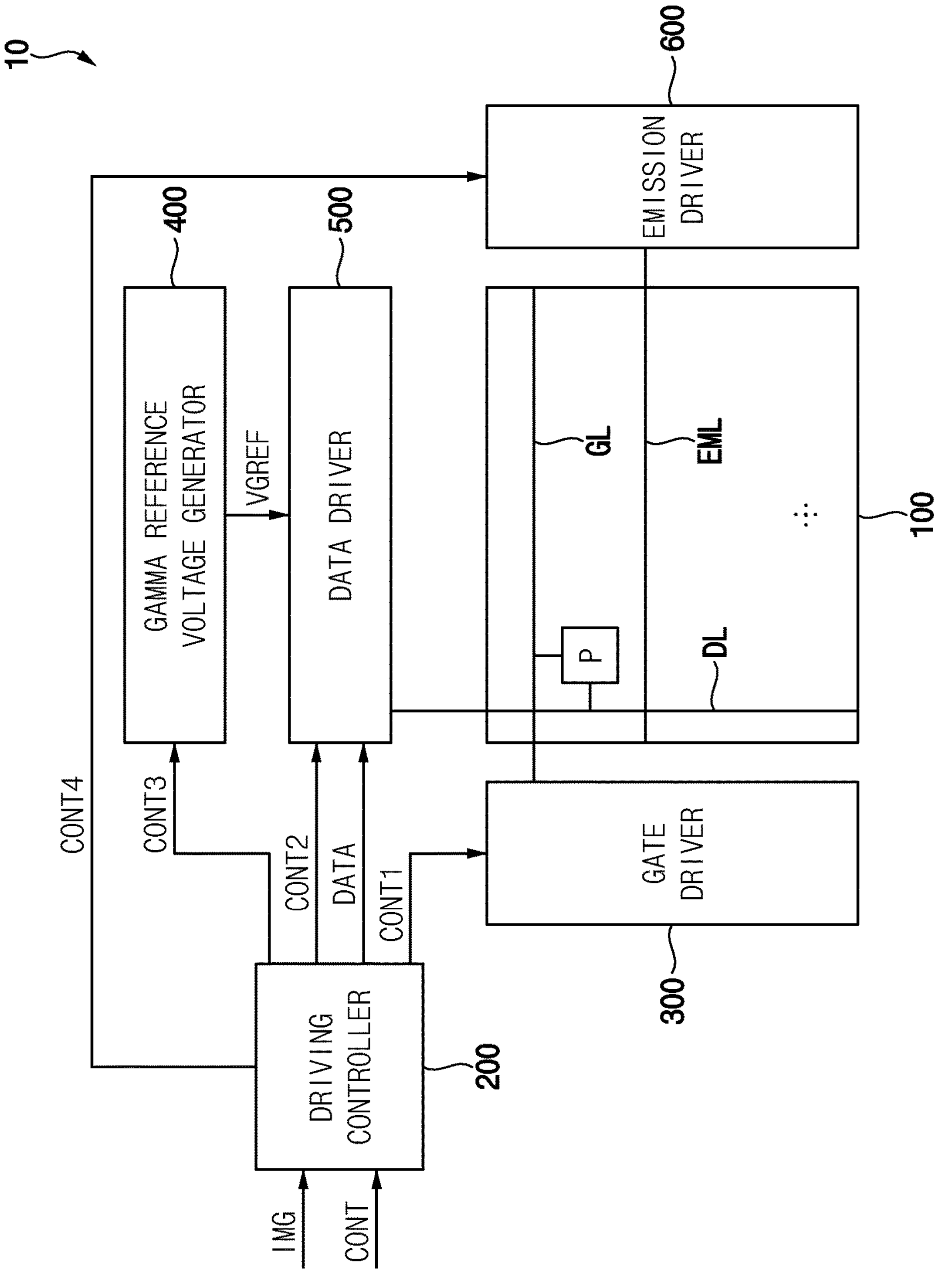
FIG. 1 is a block diagram for illustrating a display device according to embodiments of the present inventive concept.

FIG. 1 is a block diagram for illustrating a display device 10 according to embodiments of the present inventive concept.

Referring to FIG. 1, a display device 10 may include a display panel 100 and a display panel driver. The display panel driver may include a driving controller 200, a gate driver 300, a gamma reference voltage generator 400, a data driver 500, and an emission driver 600.

For example, the driving controller 200 and the data driver 500 may be integrally formed. For example, the driving controller 200, the gamma reference voltage generator 400, and the data driver 500 may be integrally formed. For example, the driving controller 200, the gate driver 300, the gamma reference voltage generator 400, and the data driver 500 may be integrally formed. For example, the driving controller 200, the gate driver 300, the gamma reference voltage generator 400, the data driver 500, and the emission driver 600 may be integrally formed. A driving module including at least the driving controller 200 and the data driver 500 which are integrally formed may be referred to as a timing controller embedded data driver (TED).

The display panel 100 may include a display region displaying an image and a peripheral region disposed adjacent to the display region.

For example, the display panel 100 may be an organic light emitting diode display panel including organic light emitting diodes. For example, the display panel 100 may be a quantum-dot organic light emitting diode display panel including organic light emitting diodes and quantum-dot color filters. For example, the display panel 100 may be a quantum-dot nano light emitting diode display panel including nano light emitting diodes and quantum-dot color filters.

The display panel 100 may include gate lines GL, data lines DL, emission lines EML, and pixel circuits P electrically connected to the gate lines GL, the data lines DL, and the emission lines EML. The gate lines GL may extend in a first direction D1, and the data lines DL may extend in a second direction D2 crossing the first direction D1. The emission lines EML may extend in the first direction D1.

The driving controller 200 may receive input image data IMG and an input control signal CONT from an external device. For example, the input image data IMG may include red image data, green image data, and blue image data. The input image data IMG may further include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the emission driver 600 based on the input control signal CONT, and output the fourth control signal CONT4 to the emission driver 600.

The gate driver 300 may generate gate signals for driving the gate lines GL in response to the first control signal CONT1 received from the driving controller 200. The gate driver 300 may output the gate signals to the gate lines GL.

In an embodiment, the gate driver 300 may be integrated on the peripheral region of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

In an embodiment, the gamma reference voltage generator 400 may be disposed in the driving controller 200 or the data driver 500.

The data driver 500 may receive the second control signal CONT2 and the data signal DATA from the driving controller 200 and receive the gamma reference voltage VGREF from the gamma reference voltage generator 400. The data driver 500 may convert the data signal DATA into a data voltage in analog form. The data driver 500 may output the data voltage to the data line DL.

The emission driver 600 may generate emission signals for driving the emission lines EML in response to the fourth control signal CONT4 received from the driving controller 200. The emission driver 600 may output the emission signals to the emission lines EML.

In an embodiment, the emission driver 600 may be integrated in the peripheral region of the display panel 100. In an embodiment, the emission driver 600 may be mounted on the peripheral portion of the display panel 100.

Although the gate driver 300 is disposed at a first side of the display panel 100 and the emission driver 600 is disposed at a second side of the display panel 100 opposite to the first side in FIG. 1 for convenience of explanation, the present inventive concept may not be limited thereto. For example, both the gate driver 300 and the emission driver 600 may be disposed at the first side of the display panel 100. In some embodiments, the gate driver 300 and the emission driver 600 may be integrally formed.

Figure 2:
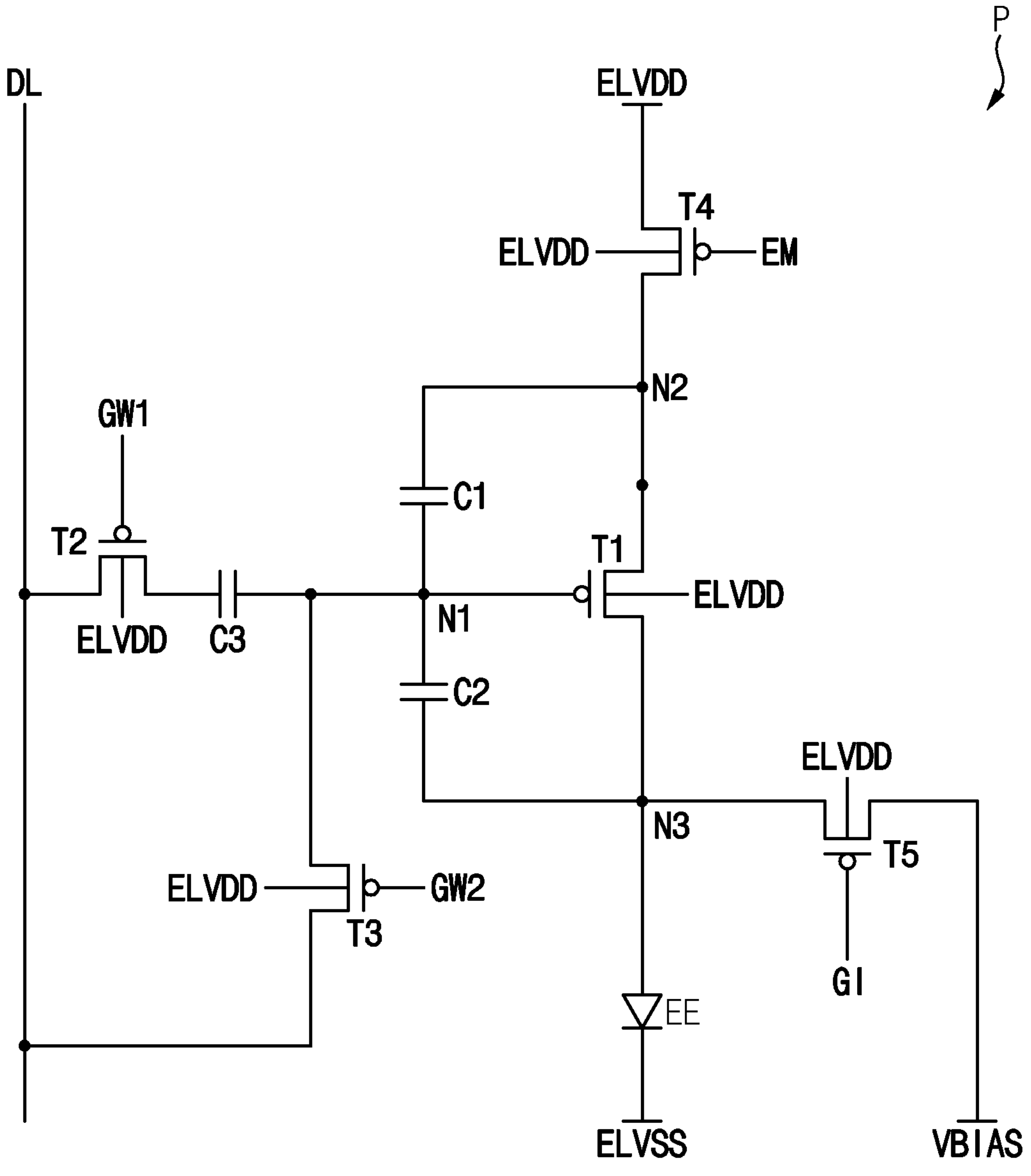
FIG. 2 is a circuit diagram for illustrating an example of a pixel circuit of FIG. 1.

FIG. 2 is a circuit diagram for illustrating an example of a pixel circuit P of FIG. 1.

Referring to FIG. 2, a pixel circuit P may include a light emitting element EE, a first transistor T1, a first capacitor C1, a second capacitor C2, a third capacitor C3, and a second transistor T2, and a third transistor T3.

The first transistor T1 may provide a driving current to the light emitting element EE. The first capacitor C1 may include a first electrode connected to a first electrode of the first transistor T1 and a second electrode connected to a gate electrode of the first transistor T1. The second capacitor C2 may include a first electrode connected to the gate electrode of the first transistor T1 and a second electrode connected to a second electrode of the first transistor T1. The third capacitor C3 may include a second electrode connected to the gate electrode of the first transistor T1, as well as a first electrode. The second transistor T2 may provide a data voltage to the first electrode of the third capacitor C3 in response to a first write gate signal GW1. The third transistor T3 may provide the data voltage to the gate electrode of the first transistor T1 in response to a second write gate signal GW2. In an embodiment, the pixel circuit P may further include a fourth transistor T4 providing a first power supply voltage ELVDD to the first transistor T1 in response to an emission signal EM. In an embodiment, the pixel circuit P may further include a fifth transistor T5 providing a bias voltage VBIAS to an anode electrode of the light emitting device EE in response to an initialization gate signal GI.

For example, the first transistor T1 may include the gate electrode connected to a first node N1, the first electrode connected to a second node N2, and the second electrode connected to a third node N3. The first capacitor C1 may include the first electrode connected to the second node N2 and the second electrode connected to the first node N1. The second capacitor C2 may include the first electrode connected to the first node N1 and the second electrode connected to the third node N3. The third capacitor C3 may include the first electrode connected to the second electrode of the second transistor T2 and the second electrode connected to the first node N1. The second transistor T2 may include a gate electrode receiving the first write gate signal GW1, a first electrode connected to a data line DL, the second electrode connected to the first electrode of the third capacitor C3. The third transistor T3 may include a gate electrode receiving the second write gate signal GW2, a first electrode connected to the data line DL, and a second electrode connected to the first node N1. The fourth transistor T4 may include a gate electrode receiving the emission signal EM, a first electrode connected to a line of the first power supply voltage ELVDD, and a second node connected to the second node N2. The fifth transistor T5 may include a gate electrode receiving the initialization gate signal GI, a first electrode connected to the third node N3, and a second electrode connected to a line of the bias voltage VBIAS.

In an embodiment, the first electrodes of the first to fifth transistors T1 to T5 may be source electrodes, and the second electrodes of the first to fifth transistors T1 to T5 may be drain electrodes.

When reverse bias is formed on the first electrode (i.e., the source electrode) of the first transistor T1 and a back gate electrode of the first transistor T1, a body effect in which a threshold voltage of the first transistor T1 is changed may occur.

In an embodiment, the back gate electrode of the first transistor T1 may receive the first power supply voltage ELVDD. When the emission signal EM has an active level, a voltage of the back gate electrode of the first transistor T1 and a voltage of the first electrode of the first transistor T1 may become the first power supply voltage ELVDD. Accordingly, the body effect may be minimized.

In an embodiment, back gate electrodes of the second to fifth transistors T2 to T5 may receive the first power supply voltage ELVDD.

In an embodiment, the first to fifth transistors T1 to T5 may be P-type transistors. For example, the first to fifth transistors T1 to T5 may be low temperature polysilicon (LTPS) thin film transistors. In this case, a low voltage level may be the active level, and a high voltage level may be an inactive level. For example, when a signal applied to a gate electrode of the P-type transistor has the low voltage level, the P-type transistor may be turned on. For example, when the signal applied to the gate electrode of the P-type transistor has the high voltage level, the P-type transistor may be turned off.

However, the present inventive concept is not limited thereto. In an embodiment, the first to fifth transistors T1 to T5 may be N-type transistors. For example, the first to fifth transistors T1 to T5 may be oxide thin film transistors. In this case, the high voltage level may be the active level, and the low voltage level may be the inactive level. For example, when a signal applied to a gate electrode of the N-type transistor has the high voltage level, the N-type transistor may be turned on. For example, when the signal applied to the gate electrode of the N-type transistor has the low voltage level, the N-type transistor may be turned off.

Figure 3:
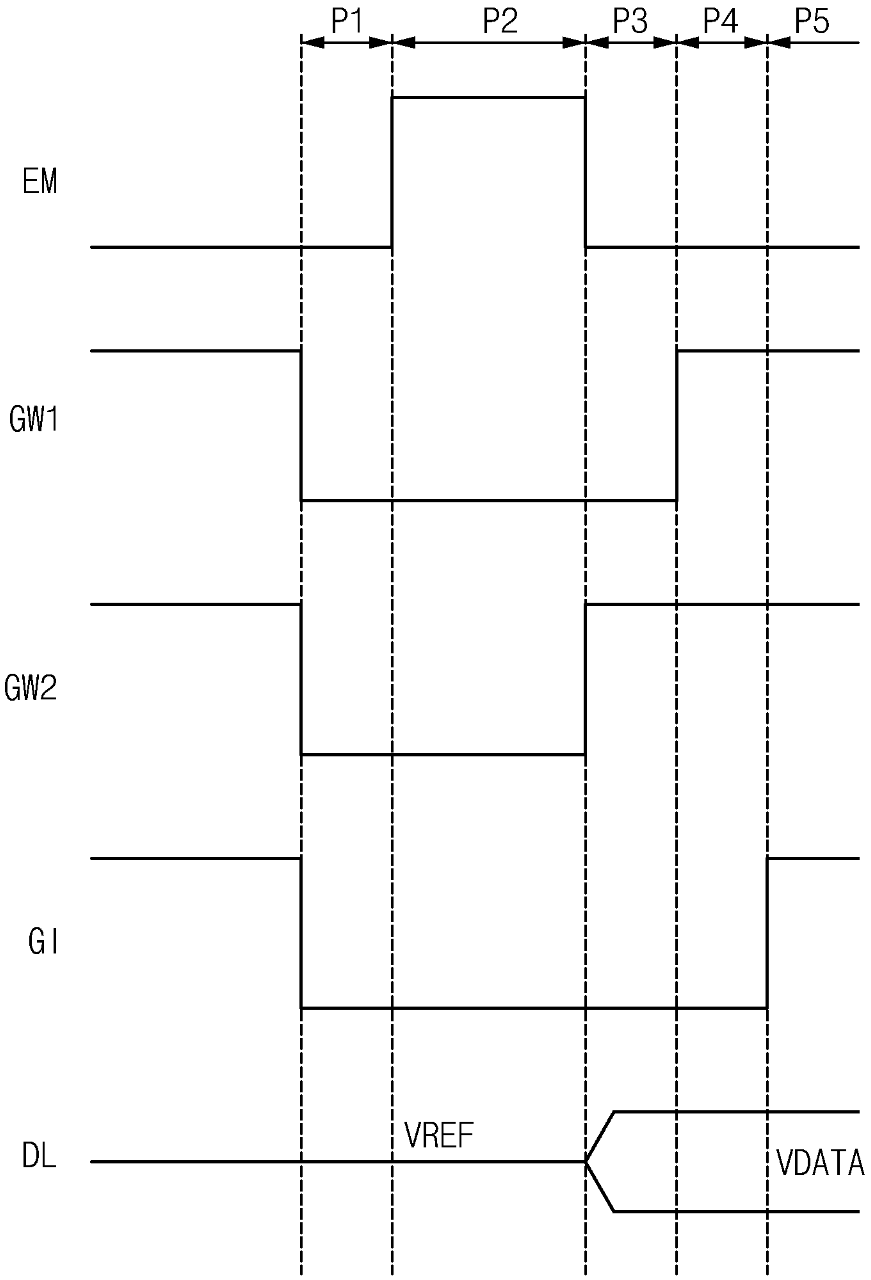
FIG. 3 is a timing diagram illustrating an example of driving the pixel circuit of FIG. 2.

FIG. 3 is a timing diagram illustrating an example of driving the pixel circuit P of FIG. 2.

Referring to FIG. 3, in a first period P1, the emission signal EM, the first write gate signal GW1, the second write gate signal GW2, and the initialization gate signal GI may have the active level.

In a second period P2 after the first period P1, the first write gate signal GW1, the second write gate signal GW2, and the initialization gate signal GI have the active level and the emission signal EM may have the inactive level.

In a third period P3 after the second period P2, the emission signal EM, the first write gate signal GW1, and the initialization gate signal GI may have the active level and the second write gate signal GW2 may have the inactive level.

In a fourth period P4 after the third period P3, the emission signal EM and the initialization gate signal GI may have the active level and the first write gate signal GW1 and the second write gate signal GW2 may have the inactive level.

In a fifth period P5 after the fourth period P4, the emission signal EM may have the active level and the first write gate signal GW1 and the second write gate signal GW2, and the emission signal EM may have the inactive level.

Figure 4:
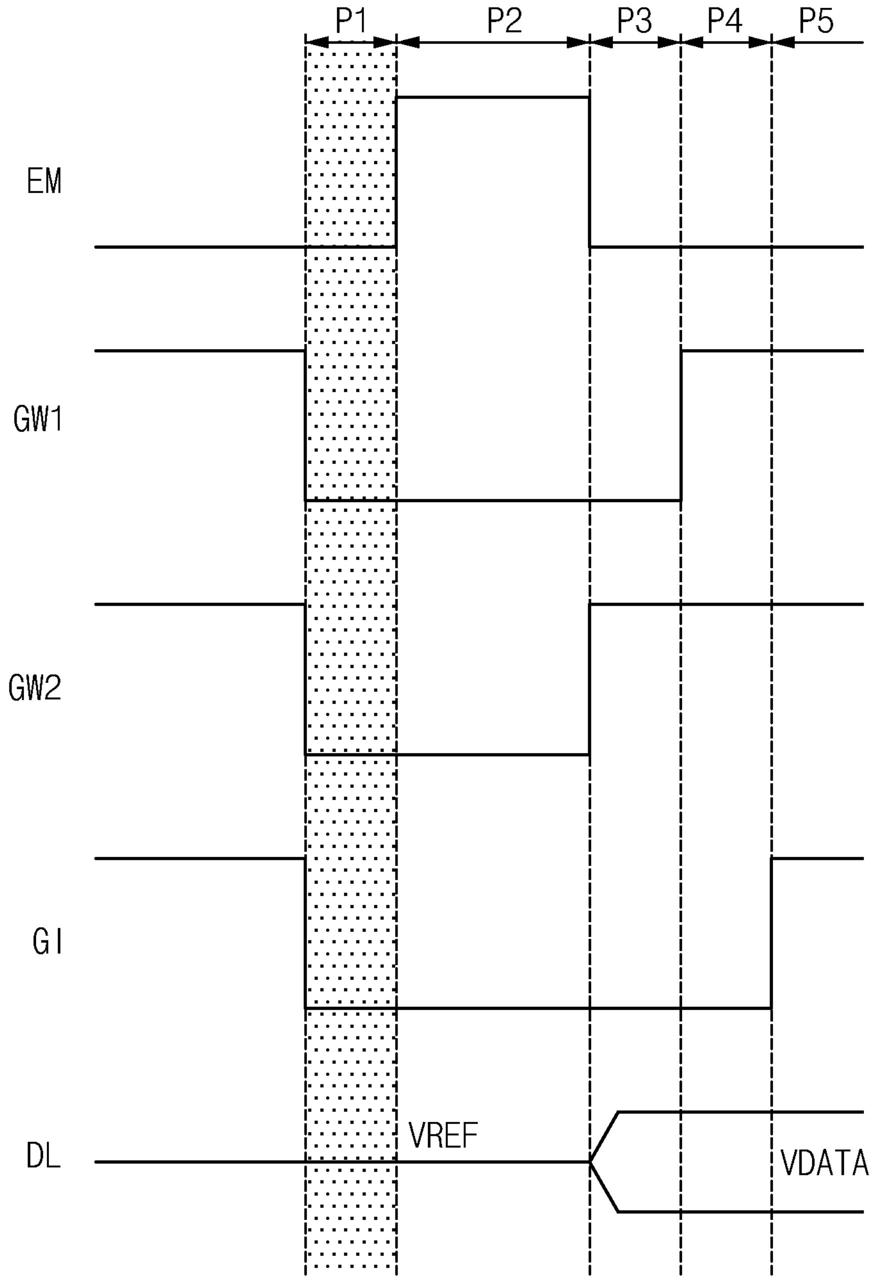
FIG. 4 is a timing diagram for illustrating an example in which the pixel circuit of FIG. 2 operates in a first period.
Figure 5:
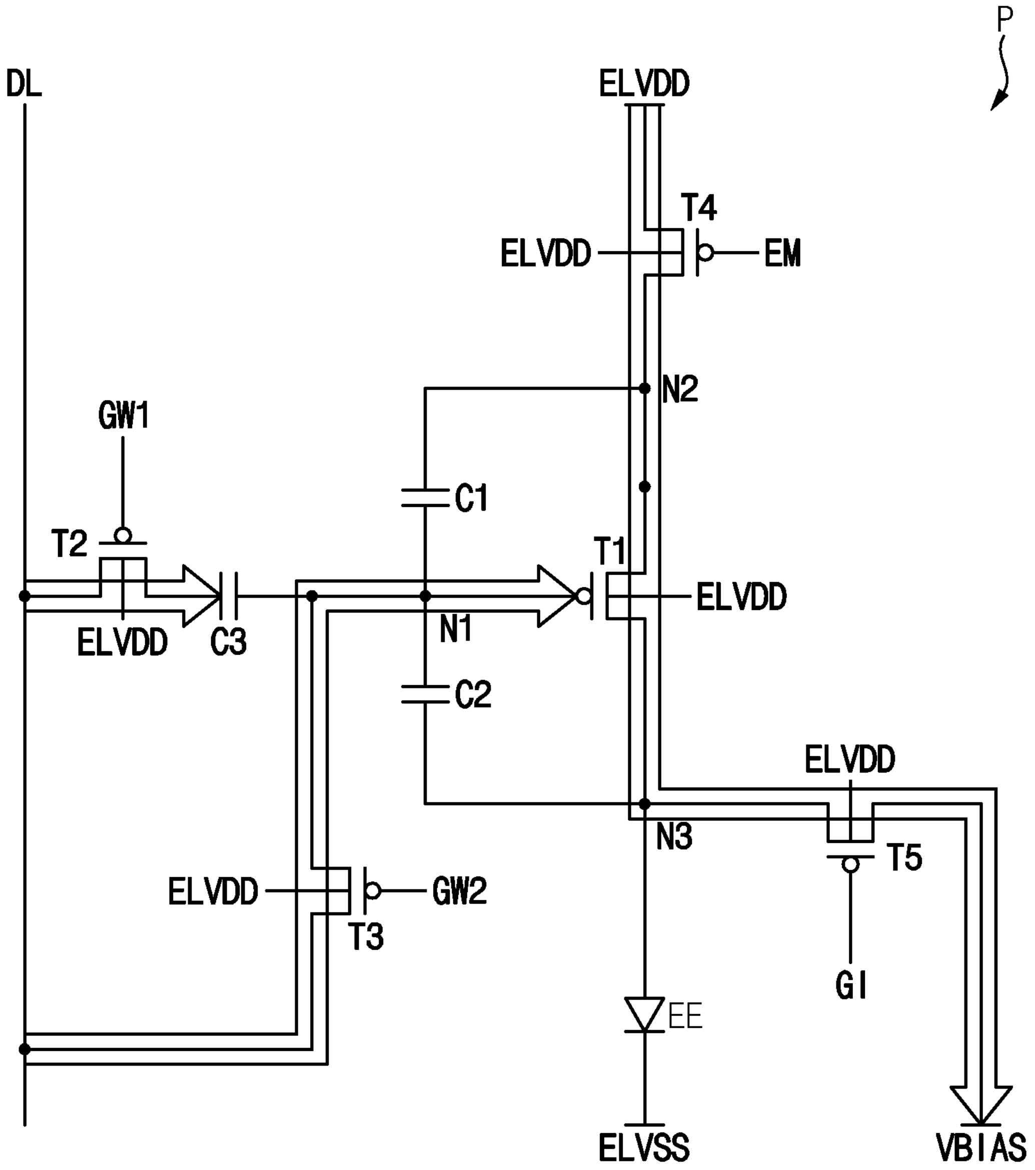
FIG. 5 is a circuit diagram for illustrating an example in which the pixel circuit of FIG. 2 operates in the first period.

FIG. 4 is a timing diagram for illustrating an example in which the pixel circuit P of FIG. 2 operates in a first period P1. FIG. 5 is a circuit diagram for illustrating an example in which the pixel circuit P of FIG. 2 operates in the first period P1.

Referring to FIGS. 4 and 5, the second to fifth transistors T2 to T5 may be turned on in the first period P1. The second transistor T2 may provide a reference voltage VREF to the first electrode of the third capacitor C3. The third transistor T3 may provide the reference voltage VREF to the first node N1. A path may be formed through the fourth transistor T4, the first transistor T1, and the fifth transistor T5. The first electrode of the first transistor T1 may be initialized through the path. The anode electrode of the light emitting element EE may be initialized through the path.

Figure 6:
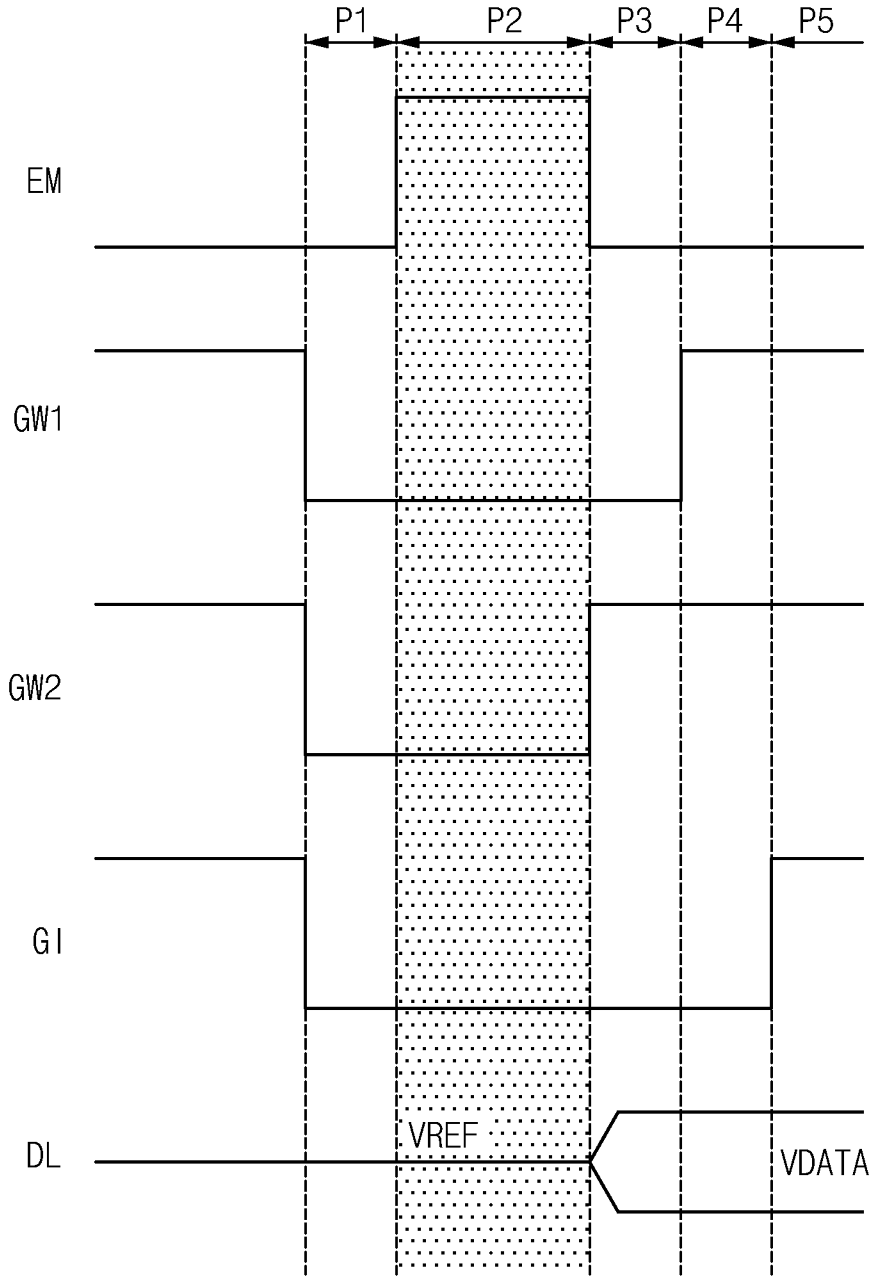
FIG. 6 is a timing diagram for illustrating an example in which the pixel circuit of FIG. 2 operates in a second period.
Figure 7:
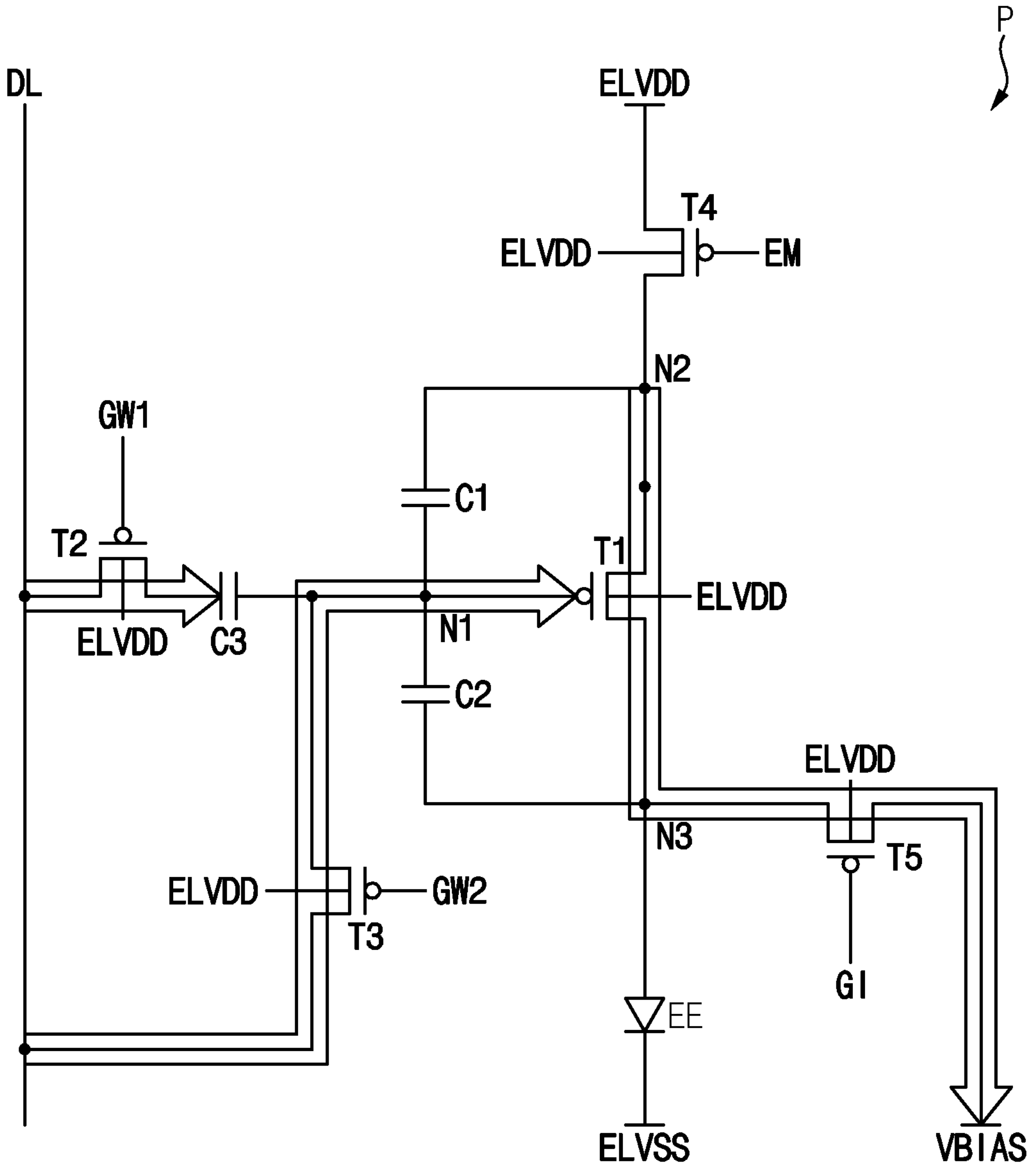
FIG. 7 is a circuit diagram for illustrating an example in which the pixel circuit of FIG. 2 operates in the second period.

FIG. 6 is a timing diagram for illustrating an example in which the pixel circuit P of FIG. 2 operates in a second period P2. FIG. 7 is a circuit diagram for illustrating an example in which the pixel circuit P of FIG. 2 operates in the second period P2.

Referring to FIGS. 6 and 7, the second transistor T2, the third transistor T3, and the fifth transistor T5 may be turned on in the second period P2. The fourth transistor T4 may be turned off in the second period P2. Since the third transistor T3 provides the reference voltage VREF to the first node N1, a voltage of the first node N1 may be the reference voltage VREF and a voltage of the second node N2 may be VREF−VTH. The second transistor T2 may provide the reference voltage VREF to the first electrode of the third capacitor C3. Here, VREF may be the reference voltage and VTH may be the threshold voltage of the first transistor T1. The first capacitor C1 may store the threshold voltage of the first transistor T1. Accordingly, the threshold voltage of the first transistor T1 may be compensated for.

In an embodiment, the reference voltage VREF may be a data voltage VDATA for a low grayscale. In an embodiment, the reference voltage VREF may be equal to the data voltage VDATA for a minimum grayscale. For example, when the reference voltage VREF is applied to the first node N1 rather than when the data voltage VDATA is applied to the first node N1, a current generated by the first transistor T1 may be small. Accordingly, since the reference voltage VREF is applied to the first node N1 in the first period P1 and the second period P2, fluctuation of the first power supply voltage ELVDD due to the current is reduced.

Figure 8:
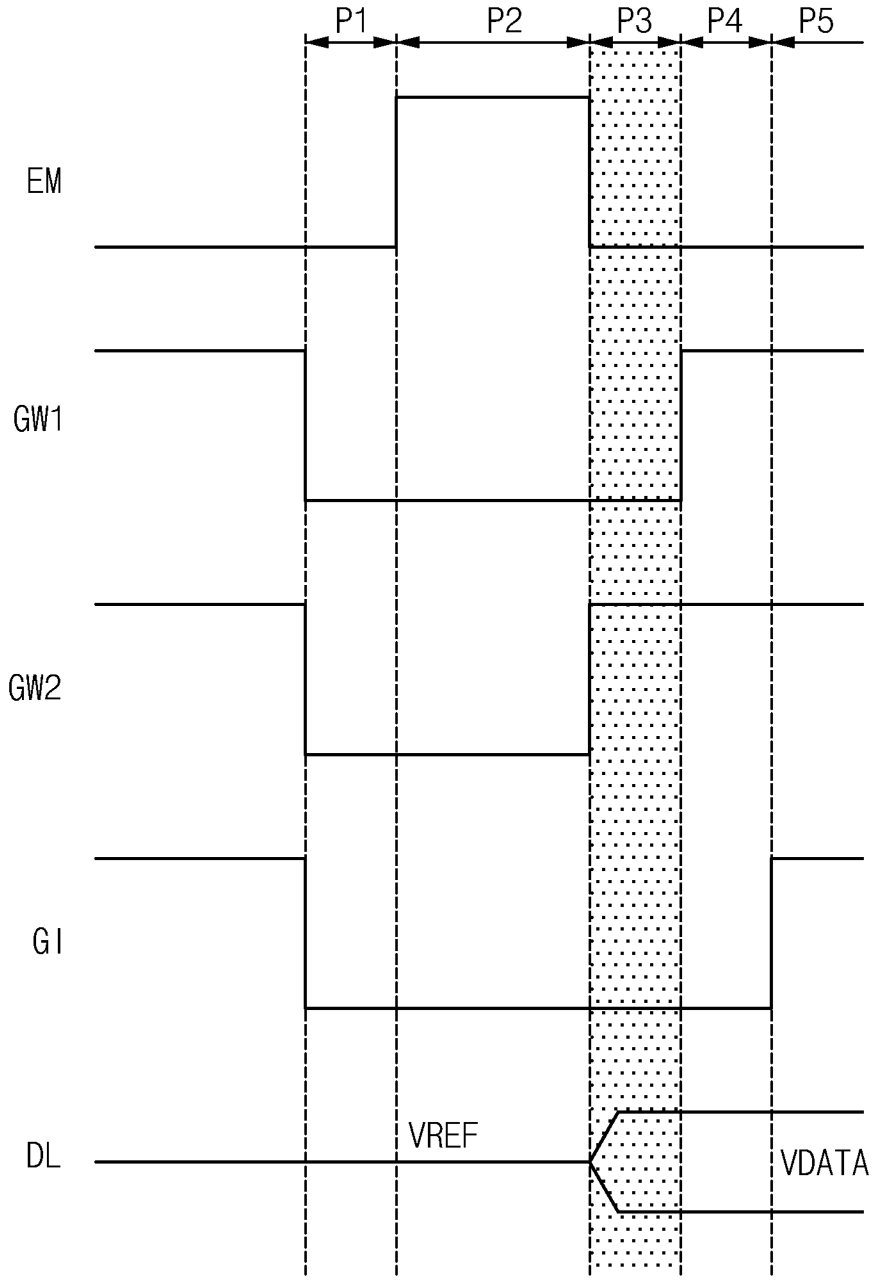
FIG. 8 is a timing diagram for illustrating an example in which the pixel circuit of FIG. 2 operates in a third period.
Figure 9:
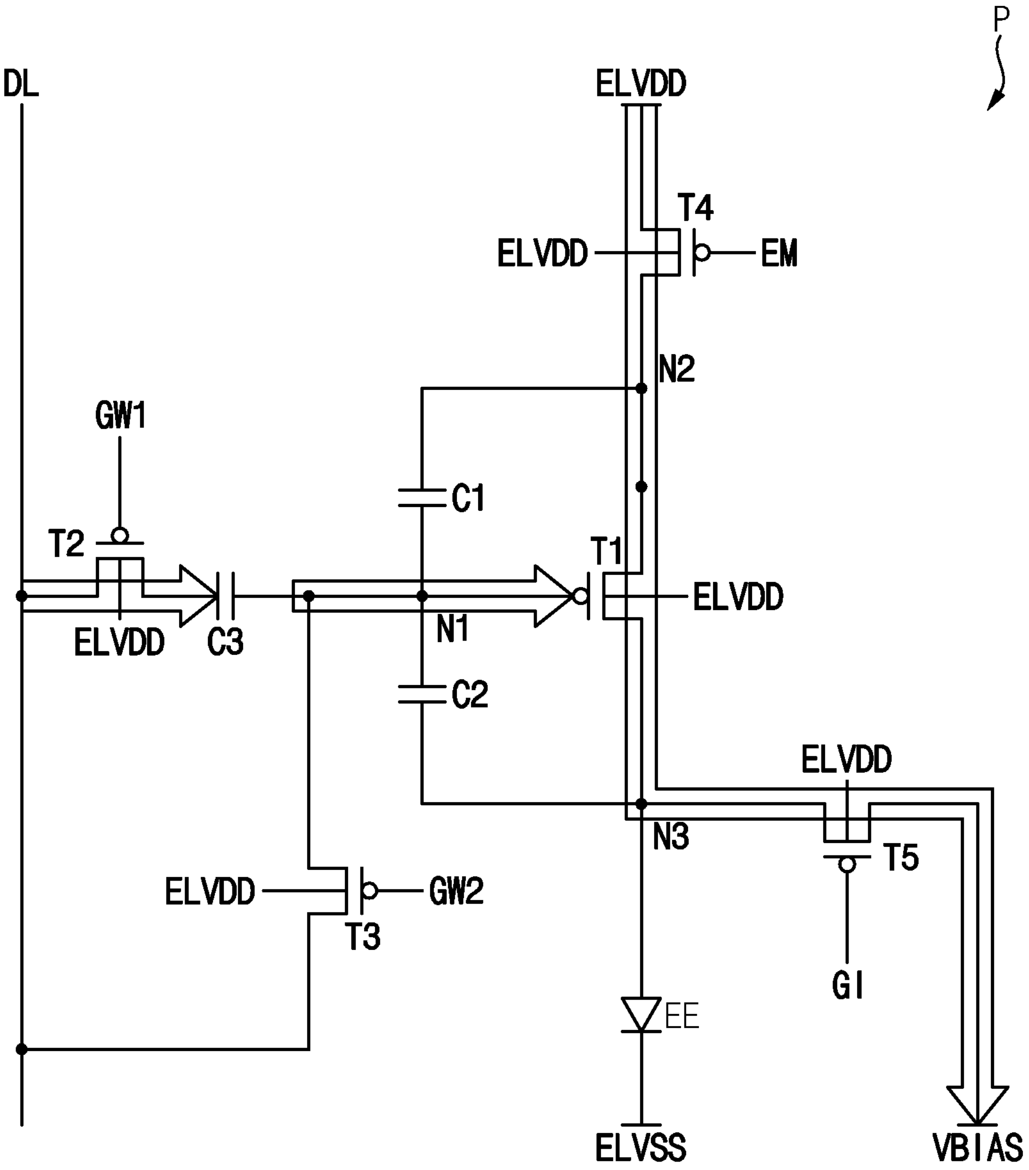
FIG. 9 is a circuit diagram for illustrating an example in which the pixel circuit of FIG. 2 operates in the third period.

FIG. 8 is a timing diagram for illustrating an example in which the pixel circuit P of FIG. 2 operates in a third period. FIG. 9 is a circuit diagram for illustrating an example in which the pixel circuit P of FIG. 2 operates in the third period P3.

Referring to FIGS. 8 and 9, the second transistor T2 and the fifth transistor T5 may be turned on in the third period P3. The third transistor T3 and the fourth transistor T4 may be turned off in the third period P3. The second transistor T2 may provide the data voltage VDATA to the first electrode of the third capacitor C3. The voltage of the second node N2 may be ELVDD. The voltage of the first node N1 may increase by (VDATA−VREF)*C_C3/(C_C3+(C_C1*C_C2/(C_C1+C_C2))) due to coupling of the first to third capacitors C1 to C3. The voltage of the first node N1 may be VREF+(VDATA−VREF)*C_C3/(C_C3+(C_C1*C_C2/(C_C1+C_C2))). The driving current of the first transistor T1 may be determined according to a gate-source voltage of the first transistor T1. The gate-source voltage of the first transistor T1 may be VREF+(VDATA−VREF)*C_C3/(C_C3+(C_C1*C_C2/(C_C1+C_C2)))−ELVDD.

As a component of VDATA in the gate-source voltage of the first transistor T1 increases, the first transistor T1 may have an adverse effect. The component of VDATA in the gate-source voltage of the first transistor T1 may be VDATA*C_C3/(C_C3+(C_C1*C_C2/(C_C1+C_C2))), and C_C3/(C_C3+(C_C1*C_C2)/(C_C1+C_C2))) may be less than 1. Therefore, although the data voltage VDATA increases, degree of increase of the component of VDATA in the gate-source voltage of the first transistor T1 may be small. Accordingly, a data range of the data voltage VDATA may be extended. Here, ELVDD is the first power supply voltage, VDATA is the data voltage, C_C1 is a capacitance of the first capacitor C1, C_C2 is a capacitance of the second capacitor C2, and C_C3 is a capacitance of the third capacitor C_C3.

Figure 10:
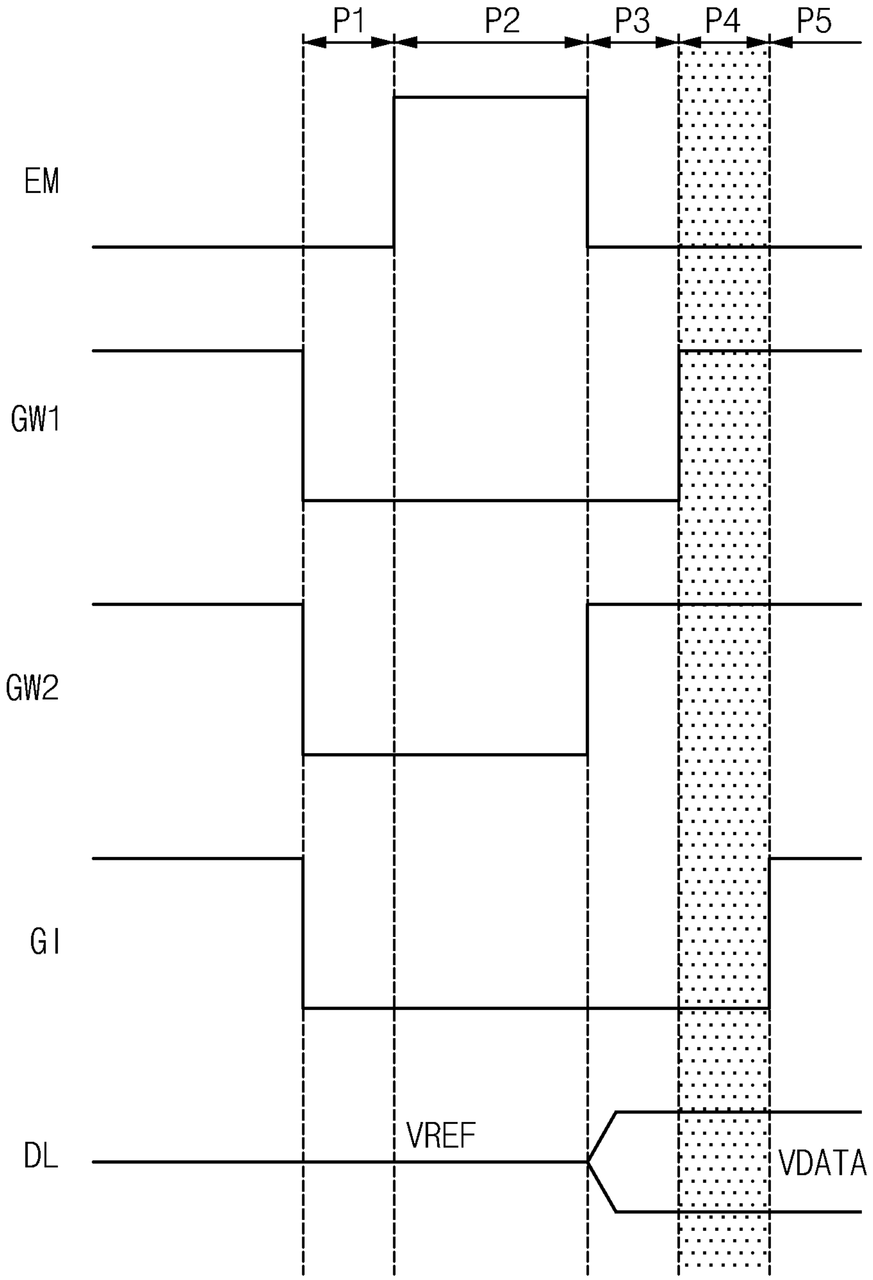
FIG. 10 is a timing diagram for illustrating an example in which the pixel circuit of FIG. 2 operates in a fourth period.
Figure 11:
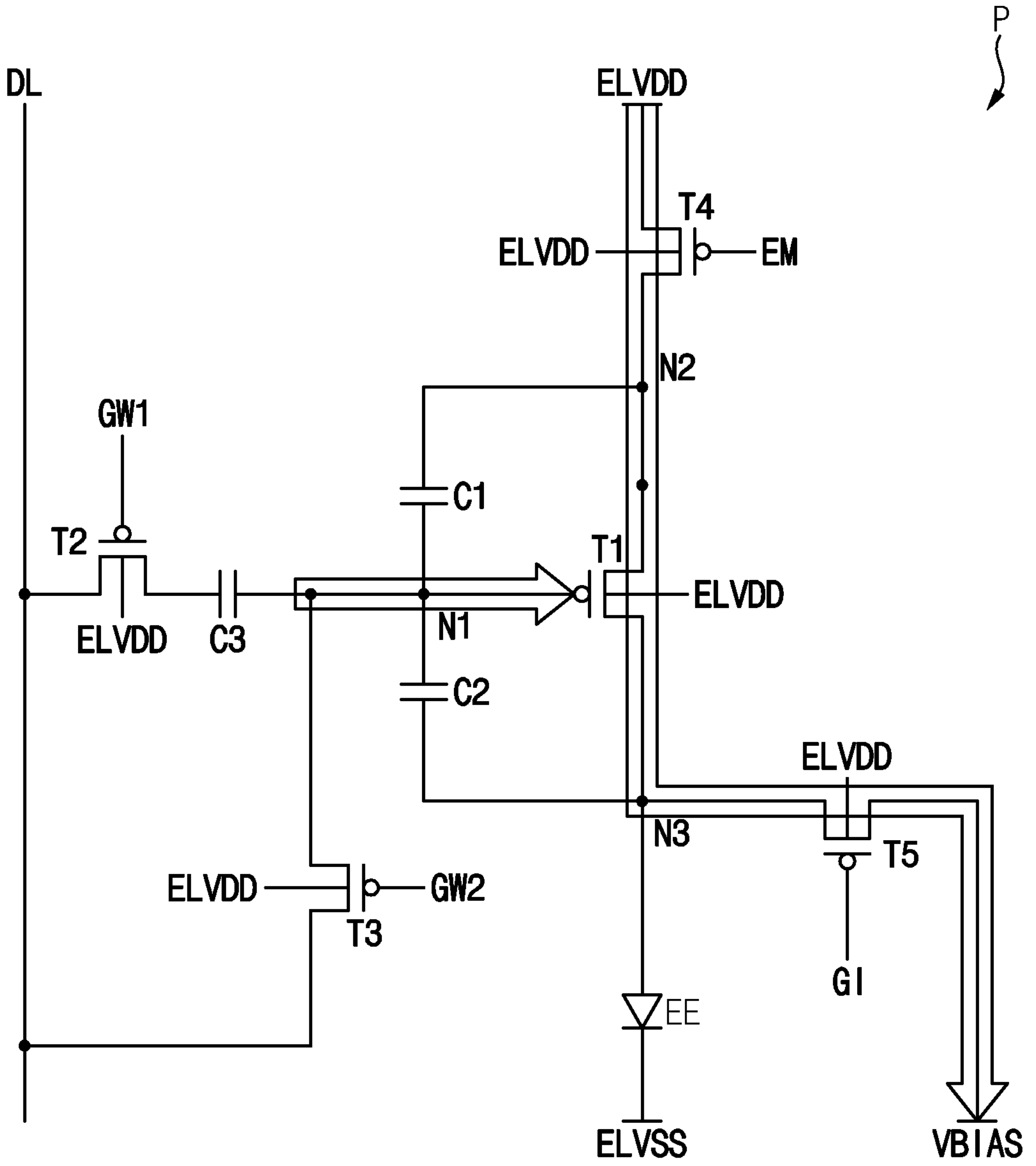
FIG. 11 is a circuit diagram for illustrating an example in which the pixel circuit of FIG. 2 operates in the fourth period.

FIG. 10 is a timing diagram for illustrating an example in which the pixel circuit P of FIG. 2 operates in a fourth period P4. FIG. 11 is a circuit diagram for illustrating an example in which the pixel circuit P of FIG. 2 operates in the fourth period P4.

Referring to FIGS. 10 and 11, the fourth transistor T4 and the fifth transistor T5 may be turned on in the fourth period P4. The second transistor T2 and the third transistor T3 may be turned off in the fourth period P4. The anode electrode of the light emitting device EE may be initialized with the bias voltage VBIAS. Accordingly, light emission of the light emitting element EE due to leakage current in the pixel circuit P displaying black may be minimized.

Figure 12:
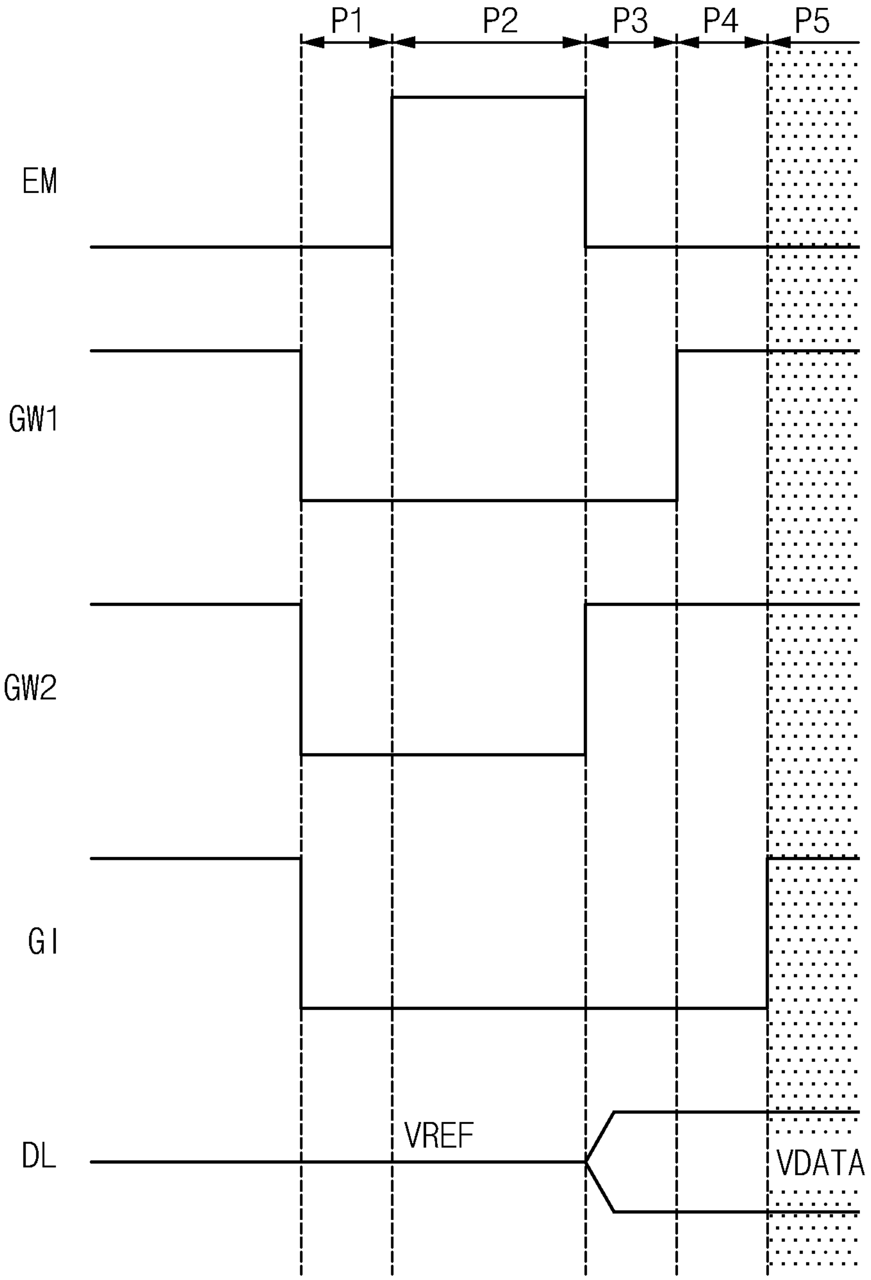
FIG. 12 is a timing diagram for illustrating an example in which the pixel circuit of FIG. 2 operates in a fifth period.
Figure 13:
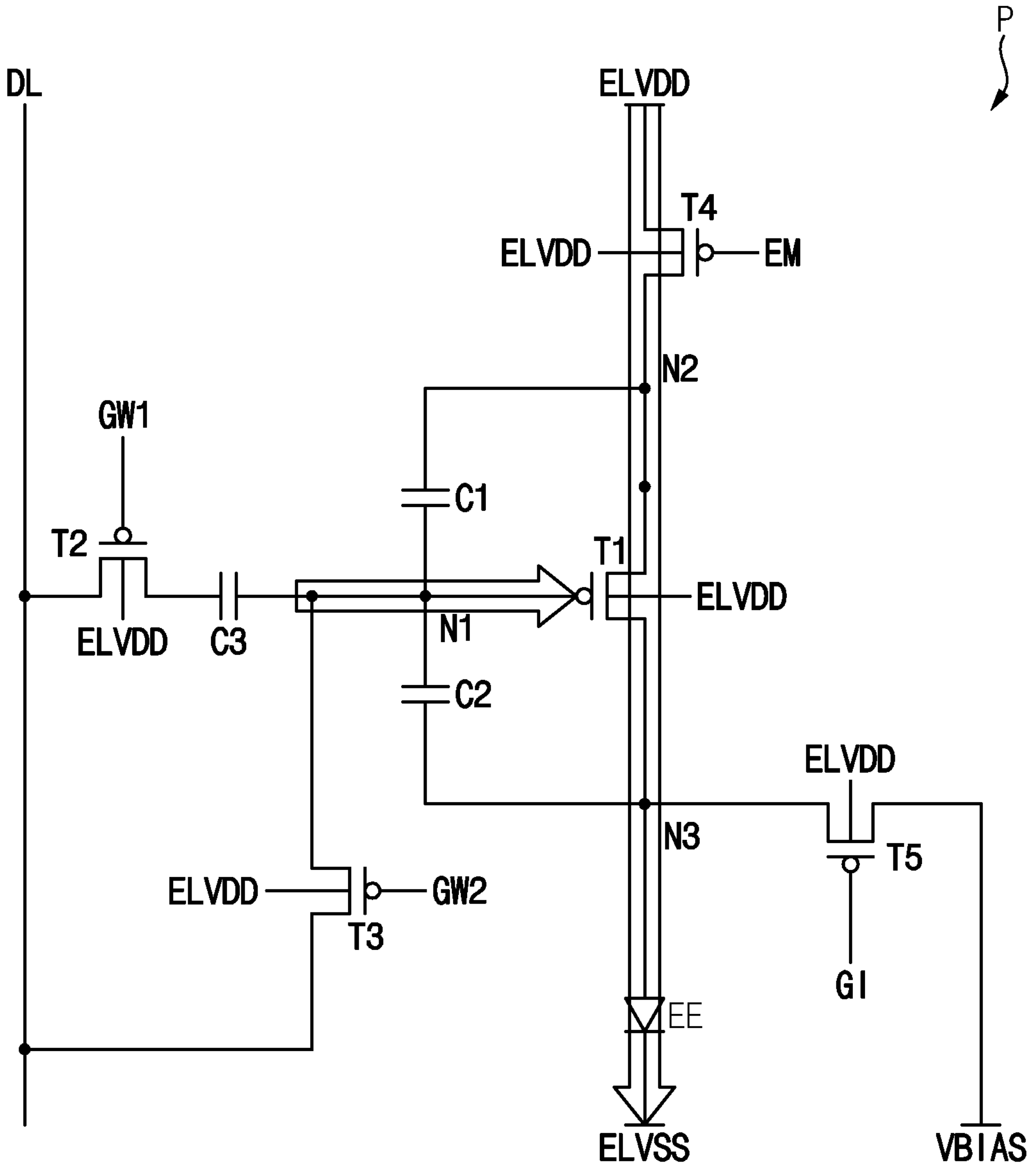
FIG. 13 is a circuit diagram for illustrating an example in which the pixel circuit of FIG. 2 operates in the fifth period.

FIG. 12 is a timing diagram for illustrating an example in which the pixel circuit P of FIG. 2 operates in a fifth period P5. FIG. 13 is a circuit diagram for illustrating an example in which the pixel circuit P of FIG. 2 operates in the fifth period P5.

Referring to FIGS. 12 and 13, the fourth transistor T4 may be turned on in the fifth period P5. The second transistor T2, the third transistor T3, and the fifth transistor T5 may be turned off in the fifth period P5.

When the second transistor T2 is turned off, the first electrode of the third capacitor C3 is put in a floating state and an effect of the capacitance of the third capacitor C3 in the gate-source voltage of the first transistor T1 may approach 0. Accordingly, the component of VDATA in the gate-source voltage of the first transistor T1 may be smaller. Accordingly, the data range of the data voltage VDATA may be additionally extended.

The light emitting element EE may emit light with a luminance corresponding to the driving current of the first transistor T1 in the fifth period P5. When the pixel circuit P is changed from the fourth period P4 to the fifth period P5, the threshold voltage of the first transistor T1 may be changed. When the threshold voltage of the first transistor T1 is changed, the driving current of the first transistor T1 may be changed. When the driving current of the first transistor T1 is changed, a voltage of the anode electrode of the light emitting element EE may be changed. Accordingly, luminance accuracy according to the data voltage VDATA may deteriorate.

When the voltage of the anode electrode of the light emitting element EE is changed, the voltage of the first node N1 may increase by $(VN3'-VN3)*C\_C2/(C\_C1+C\_C2)$ due voltage distribution of the second capacitor C2 and the third capacitor C3. The voltage of the first node N1 may be $VN1+(VN3'-VN3)*C\_C2/(C\_C1+C\_C2)$. $C\_C2/(C\_C1+C\_C2)$ may be less than 1. Although the voltage of the anode electrode of the light emitting element EE increases, degree of increase in the voltage of the first node N1 may be small, due to the presence of the second capacitor C2. Accordingly, by including the second capacitor C2, the threshold voltage of the first transistor T1 may be additionally compensated for. Here, VN1 is the voltage of the first node N1, VN3 is the voltage of the third node N3 before change, and VN3' is the voltage of the third node N3 after change.

As such, the pixel circuit P may extend the data range through voltage distribution of the first to third capacitors C1 to C3 connected to the gate electrode of the first transistor T1. The pixel circuit P may further expand the data range by allowing the first electrode of the second capacitor C2 to be in a floating state while emitting light. The pixel circuit P may include the first capacitor C1 connected between the gate electrode of the first transistor T1 and the first electrode of the first transistor T1, so that the threshold voltage of the first transistor T1 may be compensated for. The pixel circuit P may include the second capacitor C2 connected between the gate electrode of the first transistor T1 and the second electrode of the first transistor T1, so that during the light emission, the threshold voltage of the first transistor T1 may be additionally compensated for. The pixel circuit P may apply the first power supply voltage ELVDD to the back gate electrode of the first transistor T1 so that the body effect on the first transistor T1 may be minimized.

Figure 14:
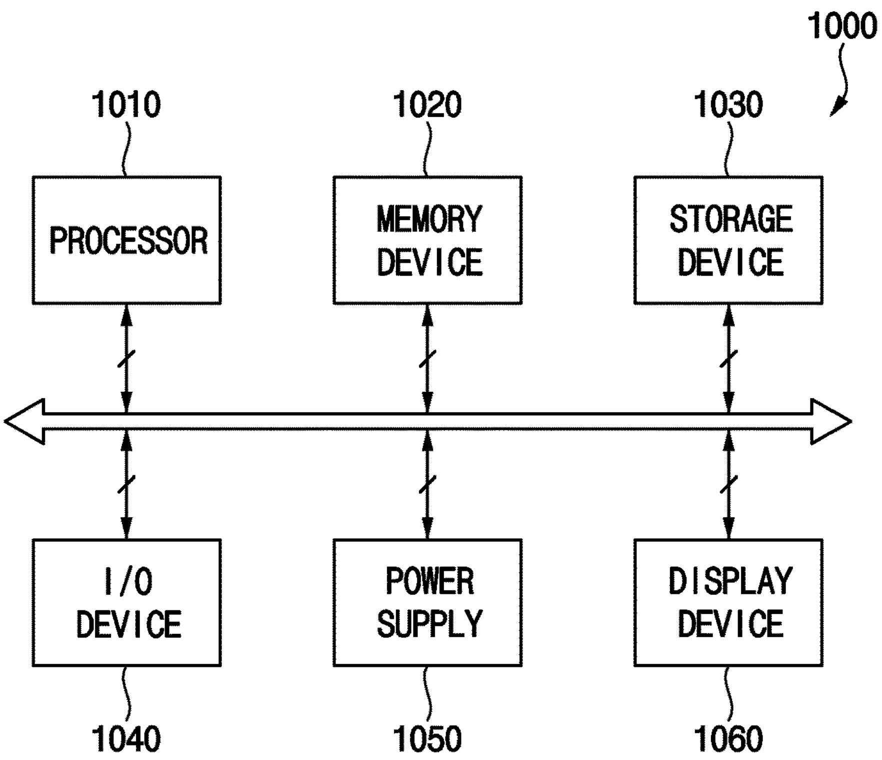
FIG. 14 is a block diagram for illustrating an electronic device according to embodiments of the present inventive concept.
Figure 15:
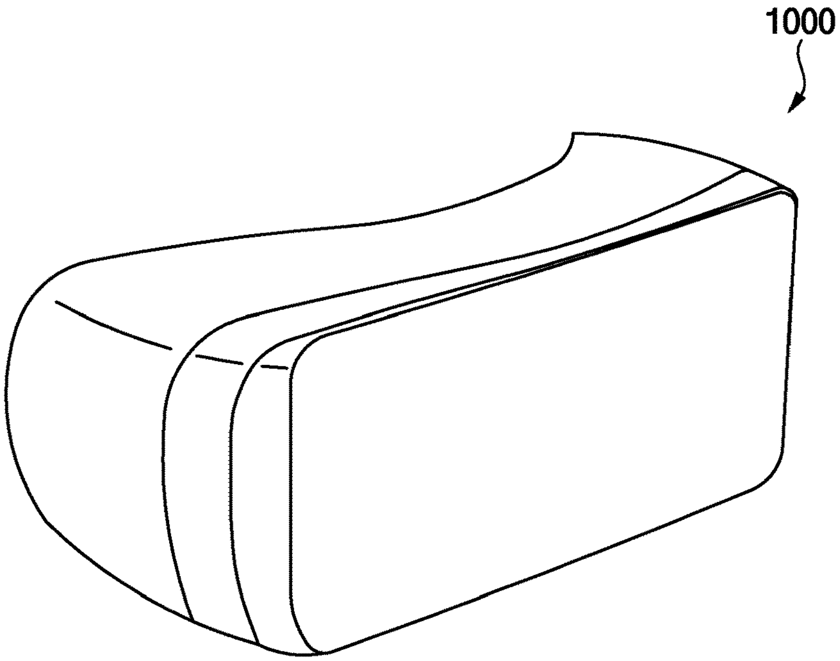
FIG. 15 is a diagram illustrating an embodiment in which the electronic device of FIG. 14 is implemented as VR device.

FIG. 14 is a block diagram illustrating an electronic device 1000. FIG. 15 is a diagram illustrating an embodiment in which the electronic device 1000 of FIG. 14 is implemented as a VR device.

Referring to FIGS. 14 and 15, the electronic device 1000 may include a processor 1010, a memory device 1020, a storage device 1030, an input/output (I/O) device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus (USB) device, other electronic device, and the like.

In an embodiment, as illustrated in FIG. 15, the electronic device 1000 may be implemented as a VR device. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a micro processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The inventive concepts may be applied to any display device and any electronic device including the touch panel. For example, the inventive concepts may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. Any functional language in the claims is intended to cover the structures described herein and not only structural equivalents but also equivalent structures. Therefore, it is to be understood that the foregoing is illustrative of the inventive concept and is not to be construed as limited to the specific embodiments disclosed, and modifications to the disclosed embodiments, as well as other embodiments, are intended to be included within the scope of the appended claims. The inventive concept is defined by the following claims, with equivalents of the claims to be included therein.

What is claimed is:

1. A pixel circuit, comprising:
- a light emitting element;
- a first transistor configured to provide a driving current to the light emitting element;
- a first capacitor including a first electrode connected to a first electrode of the first transistor and a second electrode connected to a gate electrode of the first transistor;
- a second capacitor including a first electrode connected to the gate electrode of the first transistor and a second electrode connected to a second electrode of the first transistor;
- a third capacitor including a second electrode connected to the gate electrode of the first transistor;
- a second transistor configured to provide a data voltage to a first electrode of the third capacitor in response to a first write gate signal;
- a third transistor configured to provide the data voltage to the gate electrode of the first transistor in response to a second write gate signal;
- a fourth transistor configured to provide a first power supply voltage to the first transistor in response to an emission signal; and
- a fifth transistor configured to provide a bias voltage to an anode electrode of the light emitting element in response to an initialization gate signal,
- wherein the first transistor includes a back gate electrode receiving the first power supply voltage, and
- wherein in a first period, the emission signal, the first write gate signal, the second write gate signal, and the initialization gate signal have an active level.

2. The pixel circuit of claim 1, wherein, in the first period, the second transistor is configured to provide a reference voltage to the first electrode of the third capacitor and the third transistor is configured to provide the reference voltage to the gate electrode of the first transistor.

3. The pixel circuit of claim 1, wherein, in a second period after the first period, the first write gate signal, the second write gate signal, and the initialization gate signal have the active level, and the emission signal has an inactive level.

4. The pixel circuit of claim 3 wherein the first capacitor is configured to store a threshold voltage of the first transistor when the third transistor is turned off in the second period.

5. The pixel circuit of claim 3 wherein, in a third period after the second period, the emission signal, the first write gate signal, and the initialization gate signal have the active level, and the second write gate signal has the inactive level.

6. The pixel circuit of claim 5 wherein the second transistor is configured to provide the data voltage to the first electrode of the third capacitor in the third period.

7. The pixel circuit of claim 5 wherein, in the third period, the first capacitor connected between the gate electrode and the first electrode of the first transistor compensates for the amount of change in the threshold voltage of the first transistor.

8. The pixel circuit of claim 5, wherein, in a fourth period after the third period, the emission signal and the initialization gate signal have the active level, and the first write gate signal and the second write gate signal have the inactive level.

9. The pixel circuit of claim 8, wherein, in the fourth period, the anode electrode of the light emitting element is initialized with the bias voltage.

10. The pixel circuit of claim 8, wherein, in a fifth period after the fourth period, the emission signal has the active level and the first write gate signal, the second write gate signal, and the emission signal have the inactive level.

11. The pixel circuit of claim 10 wherein, in the fifth period, the second capacitor compensates for an amount of change in voltage at the gate electrode of the first transistor that happens in response to change in voltage at the anode electrode of the light emitting element.

12. The pixel circuit of claim 1, wherein back gate electrodes of the second to fifth transistors receive the first power supply voltage.

13. The pixel circuit of claim 1, wherein the first to fifth transistors are P-type transistors.

14. A display device comprising:
- a display panel including a pixel circuit;
- a data driver configured to apply a data voltage to the pixel circuit;
- a gate driver configured to provide a first write gate signal and a second write gate signal to the pixel circuit; and
- a driving controller configured to control the data driver and the gate driver,
- wherein the pixel circuit includes:
- a light emitting element;
- a first transistor configured to provide a driving current to the light emitting element;
- a first capacitor including a first electrode connected to a first electrode of the first transistor and a second electrode connected to a gate electrode of the first transistor;
- a second capacitor including a first electrode connected to the gate electrode of the first transistor and a second electrode connected to a second electrode of the first transistor;
- a third capacitor including a second electrode connected to the gate electrode of the first transistor;
- a second transistor configured to provide a data voltage to a first electrode of the third capacitor in response to the first write gate signal;

a third transistor configured to provide the data voltage to the gate electrode of the first transistor in response to the second write gate signal;

a fourth transistor configured to provide a first power supply voltage to the first transistor in response to an emission signal; and a fifth transistor configured to provide a bias voltage to an anode electrode of the light emitting element in response to an initialization gate signal, wherein the first transistor includes a back gate electrode receiving the first power supply voltage, and wherein in a first period, the emission signal, the first write gate signal, the second write gate signal, and the initialization gate signal have an active level.

15. The display device of claim 14, wherein back gate electrodes of the second to fifth transistors receive the first power supply voltage.

16. An electronic device comprising:

a display panel including a pixel circuit;

a data driver configured to apply a data voltage to the pixel circuit;

a gate driver configured to provide a first write gate signal and a second write gate signal to the pixel circuit;

a driving controller configured to control the data driver and the gate driver; and a processor configured to control the driving controller, wherein the pixel circuit includes:

a light emitting element;

a first transistor configured to provide a driving current to the light emitting element;

a first capacitor including a first electrode connected to a first electrode of the first transistor and a second electrode connected to a gate electrode of the first transistor;

a second capacitor including a first electrode connected to the gate electrode of the first transistor and a second electrode connected to a second electrode of the first transistor;

a third capacitor including a second electrode connected to the gate electrode of the first transistor;

a second transistor configured to provide a data voltage to a first electrode of the third capacitor in response to the first write gate signal;

a third transistor configured to provide the data voltage to the gate electrode of the first transistor in response to the second write gate signal;

a fourth transistor configured to provide a first power supply voltage to the first transistor in response to an emission signal; and a fifth transistor configured to provide a bias voltage to an anode electrode of the light emitting element in response to an initialization gate signal, wherein the first transistor includes a back gate electrode receiving the first power supply voltage, and wherein in a first period, the emission signal, the first write gate signal, the second write gate signal, and the initialization gate signal have an active level.

* * * * *